United States Patent
Sayama et al.

(10) Patent No.: US 7,748,593 B2
(45) Date of Patent: Jul. 6, 2010

(54) FRICTION STIR WELDING APPARATUS AND METHOD OF OPERATING SAME

(75) Inventors: Mitsuru Sayama, Saitama (JP); Tetsuya Miyahara, Saitama (JP); Fumiaki Fukuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 294 days.

(21) Appl. No.: 11/700,803

(22) Filed: Jan. 31, 2007

(65) Prior Publication Data
US 2007/0187466 A1    Aug. 16, 2007

(30) Foreign Application Priority Data
Feb. 1, 2006    (JP)    ............... 2006-024028

(51) Int. Cl.
*B23K 20/12*    (2006.01)
*B23K 31/02*    (2006.01)

(52) U.S. Cl. ............... 228/2.1; 228/112.1; 901/42

(58) Field of Classification Search ... 228/112.1–114.5, 228/2.1–2.3; 156/73.5, 580; 901/42
See application file for complete search history.

(56) References Cited

U.S. PATENT DOCUMENTS

| | | | | |
|---|---|---|---|---|
| 1,052,490 | A * | 2/1913 | Linden et al. ............... | 219/82 |
| 2,523,367 | A * | 9/1950 | Holt ............... | 219/120 |
| 5,460,317 | A * | 10/1995 | Thomas et al. ............... | 228/112.1 |
| 6,070,784 | A * | 6/2000 | Holt et al. ............... | 228/112.1 |
| 6,367,681 | B1 * | 4/2002 | Waldron et al. ............... | 228/112.1 |
| 6,429,397 | B1 * | 8/2002 | Sun et al. ............... | 219/86.25 |
| 6,769,595 | B2 * | 8/2004 | Stol et al. ............... | 228/112.1 |
| 7,112,757 | B2 * | 9/2006 | Sun et al. ............... | 219/83 |
| 7,210,610 | B2 * | 5/2007 | Nelson et al. ............... | 228/2.1 |
| 2002/0190101 | A1 * | 12/2002 | Nelson et al. ............... | 228/112.1 |
| 2004/0256366 | A1 * | 12/2004 | Kim et al. ............... | 219/121.63 |
| 2008/0128473 | A1 * | 6/2008 | Zhou et al. ............... | 228/2.3 |

FOREIGN PATENT DOCUMENTS

JP    2002-103061    4/2002

* cited by examiner

*Primary Examiner*—Jessica L Ward
*Assistant Examiner*—Carlos Gamino
(74) *Attorney, Agent, or Firm*—Carrier, Blackman & Associates P.C.; Joseph P. Carrier; William D. Blackman

(57) ABSTRACT

A friction stir welding apparatus and a method of operating the friction stir welding apparatus are disclosed. The friction stir welding apparatus includes a rotary tool whose extremity constitutes a probe, a retaining arm which supports the rotary tool, and a roller provided at a position of the retaining arm opposite the rotary tool. The method includes adjusting the retaining arm so as to position workpieces between the rotary tool and the roller while adjusting the roller to turn in a direction where a joint line of the workpieces extends, rotating the rotary tool and lowering the probe until the probe presses the workpieces, gradually inserting the probe into the joint line, and moving the probe along the joint line.

12 Claims, 5 Drawing Sheets

FRICTION STIR WELDING APPARATUS AND METHOD OF OPERATING SAME

CROSS REFERENCE TO RELATED APPLICATIONS

This application claims the foreign priority benefit under Title 35, United States Code, §119(a)-(d) of Japanese Patent Applications No. 2006-024028 filed on Feb. 1, 2006 in the Japan Patent Office, the disclosure of which is herein incorporated by reference in its entirety.

BACKGROUND OF THE INVENTION

The present invention relates to a friction stir welding apparatus and a method of operating a friction stir welding apparatus. The Friction stir welding apparatus is usually attached to a distal end of an arm of an articulated robot.

In recent years, friction stir welding has been widely used as a joint technology without causing a deformation of workpieces to be joined together due to heat generating in the welding process. Friction stir welding is a joining process for joining two members (workpieces) together along a joint line at a joint region (butted region) of the two workpieces by rotating and pressing a rotary tool against the joint region and gradually inserting the same into the joint line, so that the material of the workpieces undergoes plastic deformation under the rotating force of the rotary tool, allowing the rotary tool to move along the joint line to thereby join the two workpieces together.

A friction stir welding apparatus is known, for example, by Japanese Laid-open Patent Application No. 2002-103061. This friction stir welding apparatus includes a retaining arm, to which a rotary tool and a receiving table are fixed in a position opposite to each other. The retaining arm of the friction stir welding apparatus is attached to a distal end of an arm of an articulated robot (hereinafter referred to as a robot arm) so that the friction stir welding apparatus is movable in three-dimensional directions through the robot arm. Meanwhile, workpieces are set on a work table, whose lower surface is provided with feed rollers. The friction stir welding apparatus is operated such that after the upper surface of the receiving table is adjusted to come into contact with the rollers so that the reaction force is applied to the friction stir welding apparatus, the rotary tool which is rotating is pressed against and inserted into the workpieces and then moved along the joint line of the workpieces, to thereby join the two workpieces together.

According to this friction stir welding apparatus, since the receiving table is fed by the feed rollers of the work table, the receiving table is capable of moving only in the feeding direction of the feed rollers during the welding process of the workpieces. Therefore, if the workpieces are joined together along a joint line extending in two or more directions, it is necessary to change the direction of the workpieces and set them on the work table whenever the direction of the joint line changes. This requires much time and labor, and thus increases the production cost in the end.

With the foregoing drawback of the prior art apparatus in view, the present invention seeks to provide a friction stir welding apparatus and a method of operating a friction stir welding apparatus, which can be readily used with workpieces to be welded along a joint line extending in two or more directions.

SUMMARY OF THE INVENTION

According to a first aspect of the present invention, there is provided a friction stir welding apparatus comprising: a rotary tool whose extremity constitutes a probe; a retaining arm which supports the rotary tool; and a roller provided at a position of the retaining arm opposite the rotary tool.

According to a second aspect of the present invention, there is provided a method of operating a friction stir welding apparatus, which comprises: a rotary tool whose extremity constitutes a probe; a retaining arm which supports the rotary tool; and a roller provided at a position of the retaining arm opposite the rotary tool. The method comprises the steps of: adjusting the retaining arm so as to position workpieces between the rotary tool and the roller while adjusting the roller to turn in a direction where a joint line of the workpieces extends; rotating the rotary tool and lowering the probe until the probe presses the workpieces; gradually inserting the probe into the joint line; and moving the probe along the joint line.

With these constructions, after the roller comes into contact with the lower surface of the work table (or workpiece(s) per se) onto which workpieces are set, the rotary tool is rotated and the probe is lowered until it presses the workpieces. The rotation of the rotary tool makes the material of the workpieces soften and allows the probe to be gradually inserted into the joint line at the joint region or the butted region of the workpieces. The probe is then moved along the joint line of the workpieces, so that the workpieces are joined together. Since the roller is provided on the retaining arm, it is possible to move the retaining arm relative to the work table in any arbitrary directions. Therefore, the friction stir welding apparatus and the method of operating the friction stir welding apparatus according to the present invention do not require setting the workpieces on the work table in conformity with the direction of the rollers of the work table whenever the direction of the joint line changes, which makes it possible to use with workpieces to be welded along a joint line extending in any directions.

In the aforementioned friction stir welding apparatus and method, the roller may be a caster roller attached to a rotary shaft member which rotates about an identical axis with a rotation axis of the rotary tool.

With this construction, since the direction of the roller can be changed by turning the rotary shaft member, it is possible to change the traveling direction of the retaining arm without requiring an adjustment of the retaining arm. This enables the friction stir welding apparatus and the method of operating the friction stir welding apparatus to be readily used with workpieces to be welded along a joint line extending in two or more directions.

In the aforementioned friction stir welding apparatus and method, the retaining arm may be attached to a distal end of a robot arm, which is movable in three-dimensional directions.

With this construction, even if the joint line of the workpieces extends along an uneven and stepped surface, manipulating the robot arm makes it possible to follow the retaining arm along the joint line. Therefore, it is possible to continuously join the workpieces together along the joint line.

In the aforementioned friction stir welding apparatus and method, the retaining arm may be of a C-shaped form.

With this construction, it is possible to effectively arrange the rotary tool and the roller in a position opposite to each other.

BRIEF DESCRIPTION OF THE DRAWINGS

The aspects of the present invention will become more apparent by describing in detail illustrative, non-limiting embodiment thereof with reference to the accompanying drawings, in which.

DESCRIPTION OF THE PREFERRED EMBODIMENTS

One preferred embodiment of the present invention will be described with reference to the accompanying drawings.

Figure 1:
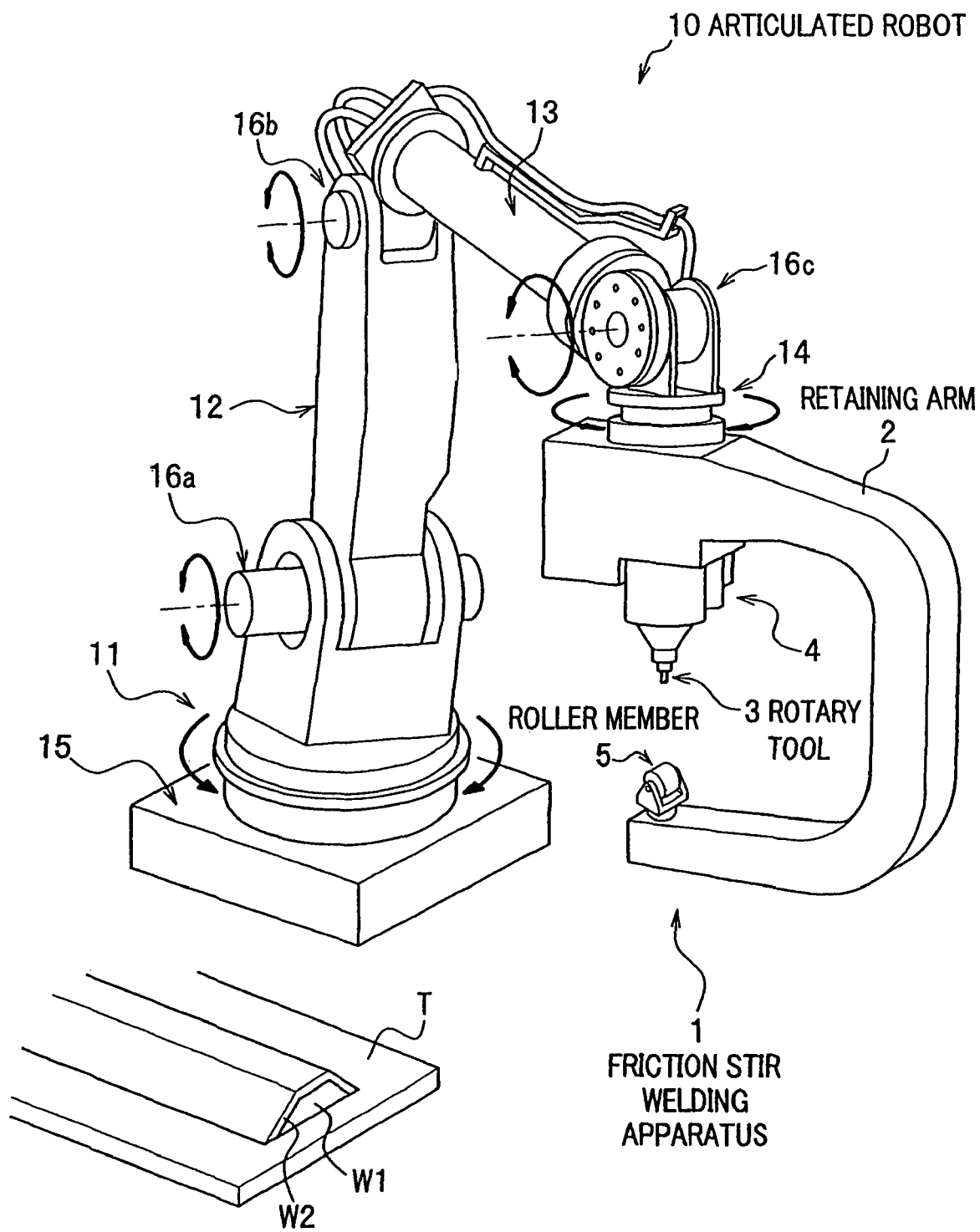
FIG. 1 is a perspective view of a general-purpose articulated robot, to which is attached a friction stir welding apparatus according to one embodiment of the present invention.

As seen in FIG. 1, a friction stir welding apparatus 1 is attached to a general-purpose articulated robot 10 and is movable in three-dimensional directions. At first, the articulated robot 10 will be described below.

Articulated Robot

The articulated robot 10 includes a turn table 11, and first, second and third arms (robot arm) 12, 13, 14 which are in this order joined together from the turn table 11 toward the distal end of the robot arm.

The turn table 11 is attached to a base 15 installed on the installation surface and rotatable around an axis substantially extending in the direction perpendicular to the base 15. The first arm 12 is attached to the turn table 11 through a first shaft member 16a which is pivotally supported on the turn table 11. The first arm 12 is therefore rotatable around the axis of the first shaft member 16a. The second arm 13 is attached to the first arm 12 through a second shaft member 16b which is pivotally supported on the first arm 12. The second arm 13 is therefore rotatable around the axis of the second shaft member 16b. The third arm 14 is attached to the second arm 13 through a third shaft member 16c. The third arm 14 is therefore rotatable around the axis of the third shaft member 16c. The third arm 14 is also rotatable relative to the axis substantially orthogonal to the axis of the third shaft member 16c. A retaining arm 2 of the friction stir welding apparatus 1 is attached to the distal end of the third arm 14.

Likewise any known conventional articulated robot, according to the articulated robot 10 as constructed above, when the first shaft member 16a, the second shaft member 16b, the third shaft member 16c, and the turn table 11 are driven by a hydraulic system (not shown), each of the first to third arms 12-14 operates so that the friction stir welding apparatus 1 attached to the distal end of the third arm 14 is movable in three-dimensional directions.

Friction Stir Welding Apparatus

Figure 2A:
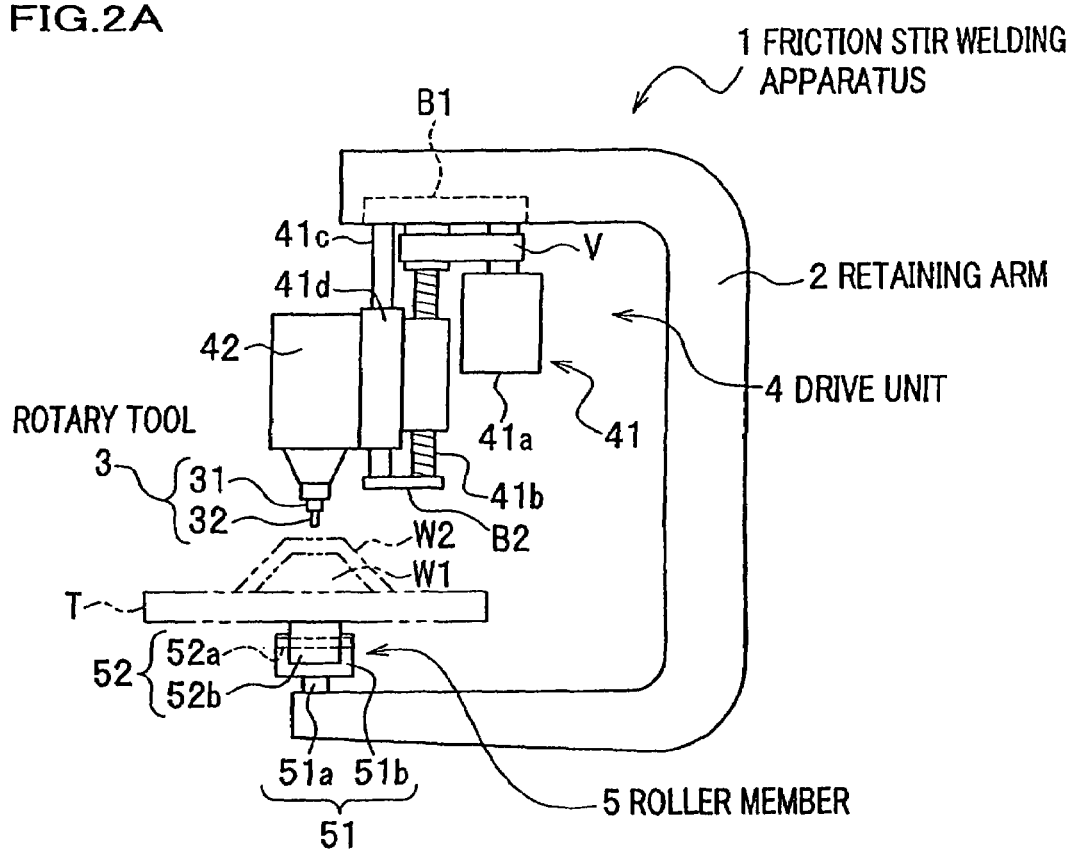
FIG. 2A is a front view of the friction stir welding apparatus, illustrating a state before the welding process is performed.
Figure 2B:
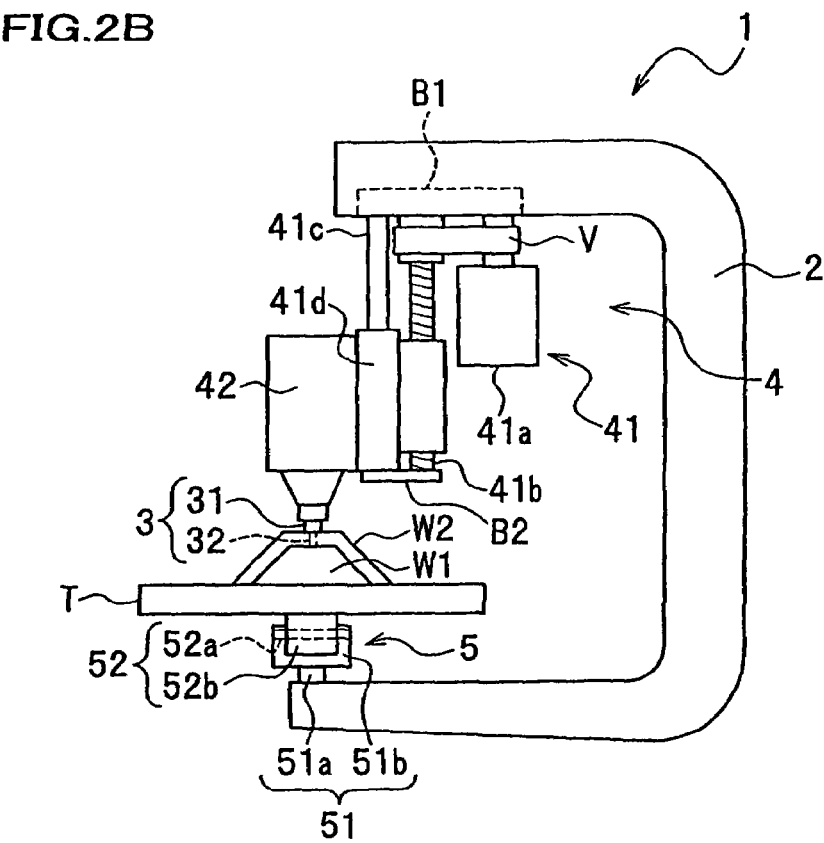
FIG. 2B is a front view of the friction stir welding apparatus, illustrating a state during the welding process.

With reference to FIGS. 2A and 2B, the friction stir welding apparatus 1 will be described. In this preferred embodiment, the position of the friction stir welding apparatus 1 as shown in FIGS. 2A and 2B is considered as a reference position, in which the distal end of the rotary tool faces downward, and upward and downward directions are defined based on this reference position.

As seen in FIG. 2A, the friction stir welding apparatus 1 includes a retaining arm 2, a rotary tool 3 supported on the retaining arm 2, a drive unit 4 for driving the rotary tool 3, and a roller member 5 supported on the retaining arm 2.

The retaining arm 2 is an arm member in the shape of a letter C as seen from the front. The rotary tool 3 is arranged at the upper part of the retaining arm 2, and the roller member 5 is arranged at the lower part of the retaining arm 2. The rotary tool 3 and the roller member 5 are positioned opposite to each other.

The rotary tool 3 is a tool for joining workpieces W1, W2 together. The rotary tool 3 includes a cylindrical body portion 31, and a probe 32 coaxially extending from the extremity of the body portion 31. The body portion 31 is coupled to the drive unit 4 to be described later. The probe 32 is a pin-shaped member having a diameter smaller than the body portion 31, and the outer periphery of the probe 32 provides a threaded screw. The length of the probe 32 is substantially the same as the thickness of the work piece W2. The body potion 31 and the probe 32 are made of a material which is harder than the workpieces W1, W2 and having a heat-resistant property for resisting frictional heat caused by the friction stir welding process.

The drive unit 4 is arranged at an upper inner side of the retaining arm 2, and includes a pressing drive unit 41 for moving the rotary tool 3 toward and away from the workpieces W, W2, and a rotary drive unit 42 for rotating the rotary tool 3.

The pressing drive unit 41 is mounted on a mount bracket B1 fixed to the upper part of the retaining arm 2. The pressing drive unit 41 includes a servo motor 41a, a ball screw 41b, a slide-guide rail 41c, and a slide table 41d.

Torque of the servo motor 41a is transmitted to the ball screw 41b through a drive belt V. The ball screw 41b is a mechanism which converts the torque of the servo motor 41a into the axial pushing force and then transmits the axial pushing force to the slide table 41d. The slide-guide rail 41c is a rail for guiding the slide table 41d. The slide-guide rail 41c is attached to the mount bracket B1 and the supporting portion B2, and extends in parallel with the ball screw 41b. The slide table 41d is supported through a nut (not shown), which is threadedly engageable with the ball screw 41b, over the ball screw 41b and the slide-guide rail 41c. The rotary tool 3 is further attached to the slide table 41d through the rotary drive unit 42.

In the pressing drive unit 41, when the servo motor 41a is driven and the ball screw 41b rotates, this rotating force of the ball screw 41b is transmitted to the slide table 41d as the axial pushing force to thereby move the slide table 41d in one direction along the slide-guide rail 41c. The slide table 41d moves up and down when the ball screw 41b is rotated in the clockwise and counterclockwise directions. Therefore, the rotary tool 3 can be moved in the directions toward and away from the workpieces W1, W2.

The rotary drive unit 42 consists of a servo motor, and is attached to the slide table 41d. The rotary shaft of the servo motor as the rotary drive unit 42 is coupled with the rotary tool 3 so that when the rotary drive unit 42 is driven, the rotary tool 3 rotates.

The roller member 5 supports a load (pressing force), which is applied by the rotary tool 3 to the workpieces W1, W2 during the welding process, from the lower side of the work table T to be fixed to a predetermined position. The roller member 5 also guides the movement of the retaining arm 2. The roller member 5 is a so-called caster including a rotary shaft member 51, and a caster roller (roller) 52 attached to the rotary shaft member 51.

The rotary shaft member 51 includes a shaft main body 51a, and a roller holder 51b provided at the upper part of the shaft main body 51a. The shaft main body 51a is mounted on the retaining arm 2 in such a manner as to be coaxial with (the axis of the shaft main body 51a is identical with) and rotatable with the rotation axis of the rotary tool 3. The rotary shaft member 51 extends along the same axis as that of the rotary tool 3, so that the load from the rotary tool 3 can be linearly received by the rotary shaft member 51. Further, turning the rotary shaft member 51 allows the caster roller 52 to be directed to any arbitrary directions. The roller holder 51b is a U-shaped member for rotatably supporting therein the caster roller 52.

The caster roller 52 includes a roller shaft 52a orthogonal to the axis of the rotary shaft member 51, and a roller body 52b integral with the roller shaft 52a. Both ends of the roller shaft 52a are supported by the roller holder 51b. The roller body 52b is a cylindrical member whose roller surface faces toward the rotary tool 3, and the roller shaft 52a penetrates through the center of the roller body 52b. The roller body 52b rotates around the axis of the roller shaft 52a to guide the retaining arm 2 along the work table T. The width of the roller body 52b can be modified when necessary in accordance with the load applied from the rotary tool 3.

Workpieces W1, W2

Workpieces W1, W2 (members to be joined together along the joint line) will be described below. The workpieces W1, W2 are members, for example, made of aluminum alloy. The workpiece W1 is a longitudinal member whose cross-section is trapezoidal. The workpiece W2 is a thin plate-like member which is pressed into the shape to cover the upper surface of the workpiece W1. The workpieces W1, W2 are placed one on top of another and set on (fixed to) the work table T. The workpieces W1, W2 are welded by the friction stir welding apparatus 1.

Operation of Friction Stir Welding Apparatus

Figure 3:
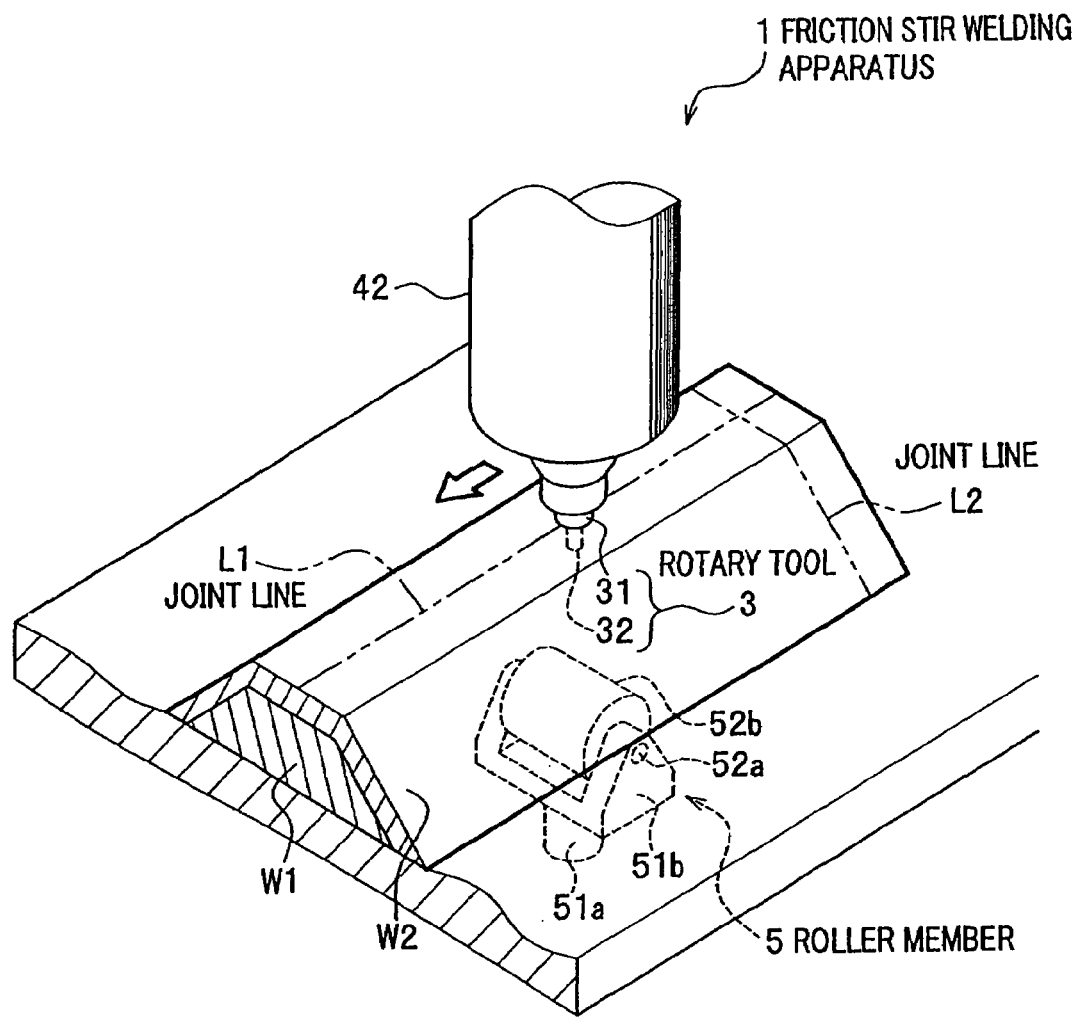
FIG. 3 is an enlarged perspective view of the friction stir welding apparatus, illustrating main parts during the welding process.

With reference to the drawings, the operation of the friction stir welding apparatus 1 will be described. In the following description, an explanation will be given of the case in which the workpieces W1, W2 are joined together along the joint line L1 as shown in FIG. 3. In order to move the friction stir welding apparatus 1 along a predetermined locus, the movement of the articulated robot 10 is programmed (taught) in advance in accordance with shapes of the workpieces W1, W2.

At first, as seen in FIG. 1, the articulated robot 10 is operated to move the friction stir welding apparatus 1. To be more specific, as seen in FIG. 2A, the retaining arm 2 is moved and positioned for the workpieces W1, W2 to be set on the work table T between the rotary tool 3 and the roller member 5. The roller body 52b of the roller member 5 is then moved to come into contact with the lower surface of the work table T. During this time, the roller body 52b of the roller member 5 is adjusted to turn in the direction where the joint line L1 of the workpieces W1, W2 extends.

The pressing drive unit 41 is driven while driving the rotary drive unit 42 and thus rotating the rotary tool 3. The rotary tool 3 then lowers while rotating, so that the probe 32 presses the workpieces W1, W2. As seen in FIG. 2B, the workpieces W1, W2 are softened by frictional heat caused by the rotation of the rotary tool 3, and the probe 32 of the rotary tool 3 is gradually inserted into the softened area of the workpiece W2 that is positioned above the workpiece W1. The probe 32 then reaches a region adjacent to the joint region of the workpieces W1, W2. During this time, the work table T is supported by the roller member 5 positioned below the work table T. Since the work table T is supported by the roller member 5, a sufficient reaction force can be obtained from below the work table T against the pressing force of the probe 32. According to the friction stir welding apparatus 1, even if an increased load is applied from the rotary tool 3 to the workpieces W1, W2, the reaction force can be adjusted at the pressing drive unit 41.

As seen in FIG. 3, the probe 32 of the rotary tool 3 is then moved along the joint line L1 of the workpieces W1, W2 while the probe 32 which is rotating is inserted into the workpiece W2. The movement of the probe 32 can be facilitated because the roller body 52b of the roller member 5 turns. Rotating and moving the probe 32 along the joint line L1 enables the material of the workpieces W1, W2 to be plasticized in a region adjacent to the joint region of the workpieces W1, W2 due to frictional heat generated between the probe 32 and the material of the workpieces W, W2. Therefore, the workpieces W1, W2 are joined together along the joint line L1.

According to the friction stir welding apparatus 1, even if a joint line of workpieces extends along an uneven and stepped surface, it is possible to continuously join the workpieces together along the joint line. For example, the friction stir welding apparatus 1 is able to join the workpieces W1, W2 together along the joint line L2 as shown in FIG. 3.

Figure 4A:
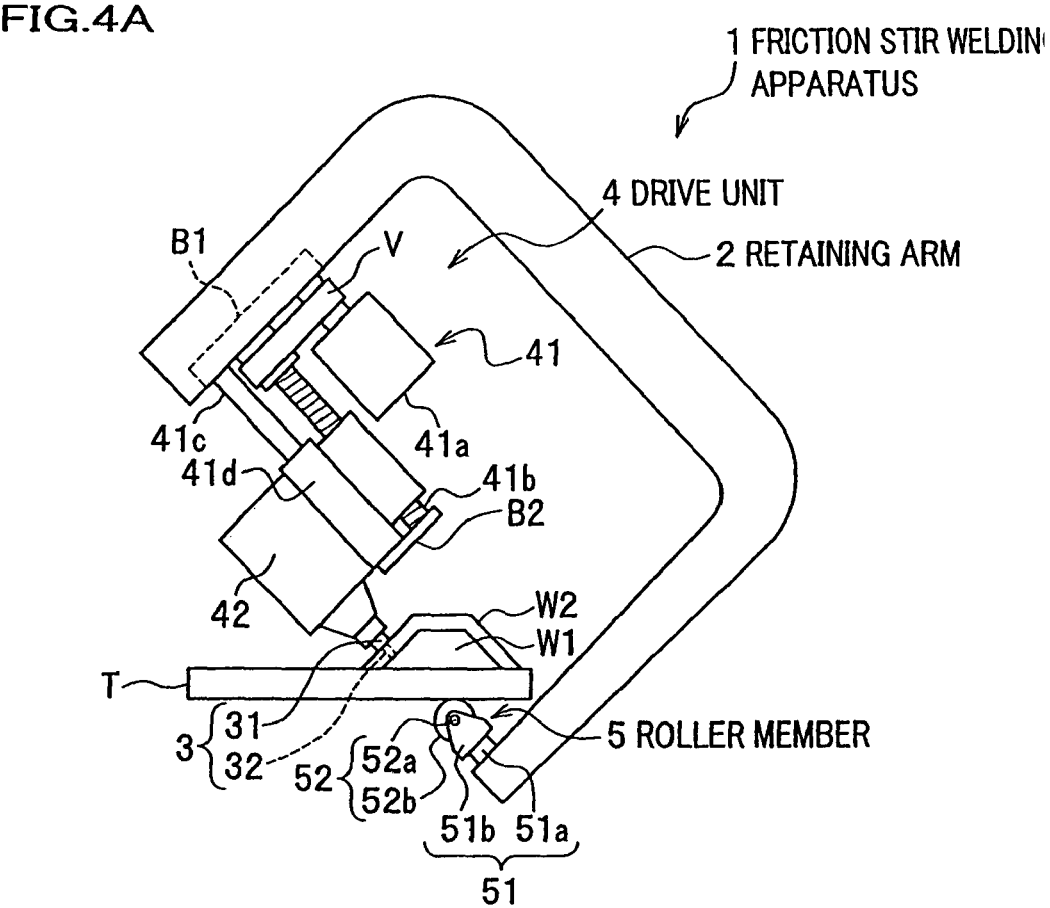
FIG. 4A is a front view of the friction stir welding apparatus, illustrating a state when the welding process is initiated.
Figure 4B:
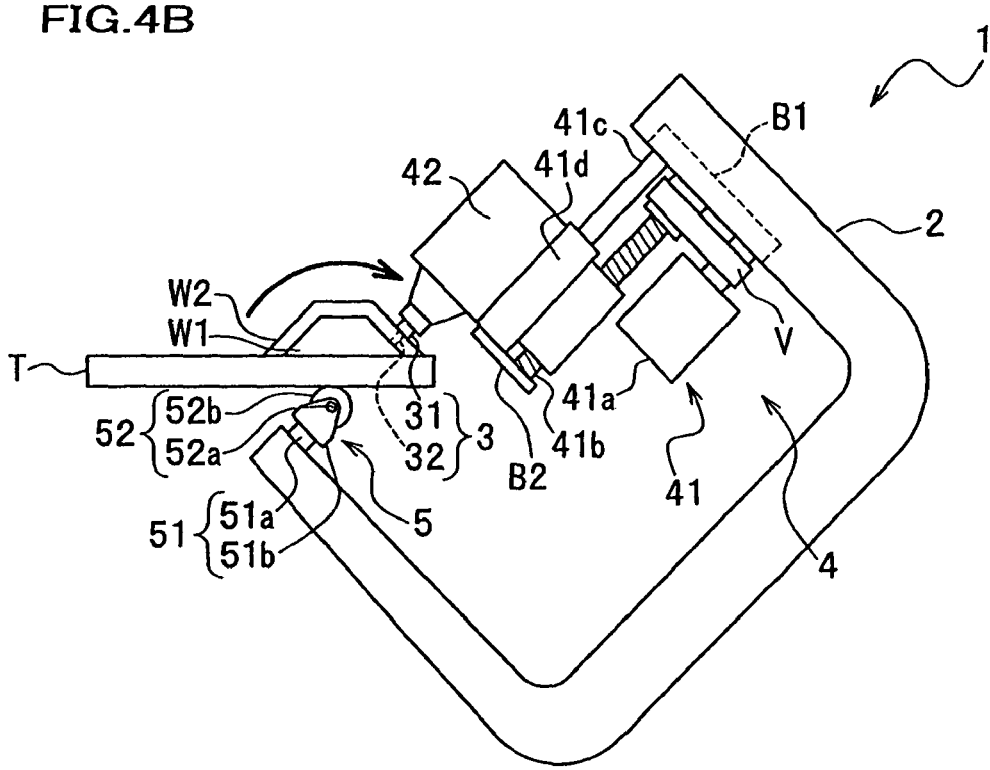
FIG. 4B is a front view of the friction stir welding apparatus, illustrating a state during the welding process.

As shown in FIG. 4A, the position of the retaining arm 2 is adjusted so that the line connecting the rotary tool 3 and the roller member 5 becomes substantially orthogonal to the joint region of the workpieces W1, W2. Thereafter, the probe 32 of the rotary tool 3 that is rotating is gradually inserted into the joint line L2 (FIG. 3) in the joint region of the workpieces W1, W2 while supporting the lower surface of the work table T by the roller member 5. Next, as shown in FIG. 4B, while positioning the workpieces W1, W2 between the rotary tool 3 and the roller member 5, the rotary tool 3 is moved along the joint line L2 as shown in FIG. 3. During this time, the tilt angle of the retaining arm 2 is adjusted through the articulated robot 10 so that a load from the rotary tool 3 constantly acts in the direction orthogonal to the joint line L2. Further, the vertical movement distance of the rotary tool 3 is adjusted through the pressing drive unit 41 so that the insertion depth of the probe 32 into the workpiece W2 is kept constant. Therefore, the workpieces W1, W2 are highly accurately joined together along the joint line L2. The pressing force of the rotary tool 3 against the workpieces W1, W2 is controlled, for instance, by detecting the reaction force applied to the rotary tool 3 with the use of a pressure sensor, and by controlling the servo motor 41a based on this detected value.

According to the friction stir welding apparatus 1, the following advantages can be obtained.

In the friction stir welding apparatus 1, the roller member 5 is provided on the retaining arm 2. Therefore, unlike the conventional arrangement in which the work table is provided with rollers, the retaining arm 2 can be moved in any arbitrary directions relative to the work table T. Therefore, the friction stir welding apparatus 1 does not require setting the workpieces W1, W2 in conformity with the direction of the rollers of the work table T whenever the direction of the joint line L2 changes, which makes it possible to use with workpieces to be welded along a joint line extending in any directions (two or more directions) on a plane.

In the friction stir welding apparatus 1, even if the joint line L2 extends along an uneven and stepped surface, manipulating the robot arm 10 makes it possible to follow the retaining arm 2 along the joint line L2. Especially, since the roller member 5 is provided on the retaining arm 2, the roller member 5 tilts in such a manner as to follow the tilting movement of the retaining arm 2. This makes it possible to generate a sufficient reaction force from below the workpieces W1, W2. Therefore, even if the workpieces W1, W2 extend in three-dimensional directions, the workpieces can be continuously and highly accurately joined together along the joint line L2.

While a friction stir welding apparatus according to the present invention has been described in detail with reference to the preferred embodiment thereof, the present invention is not limited to this specific embodiment and various changes and modifications may be made without departing from the scope of the attached claims.

Figure 5:
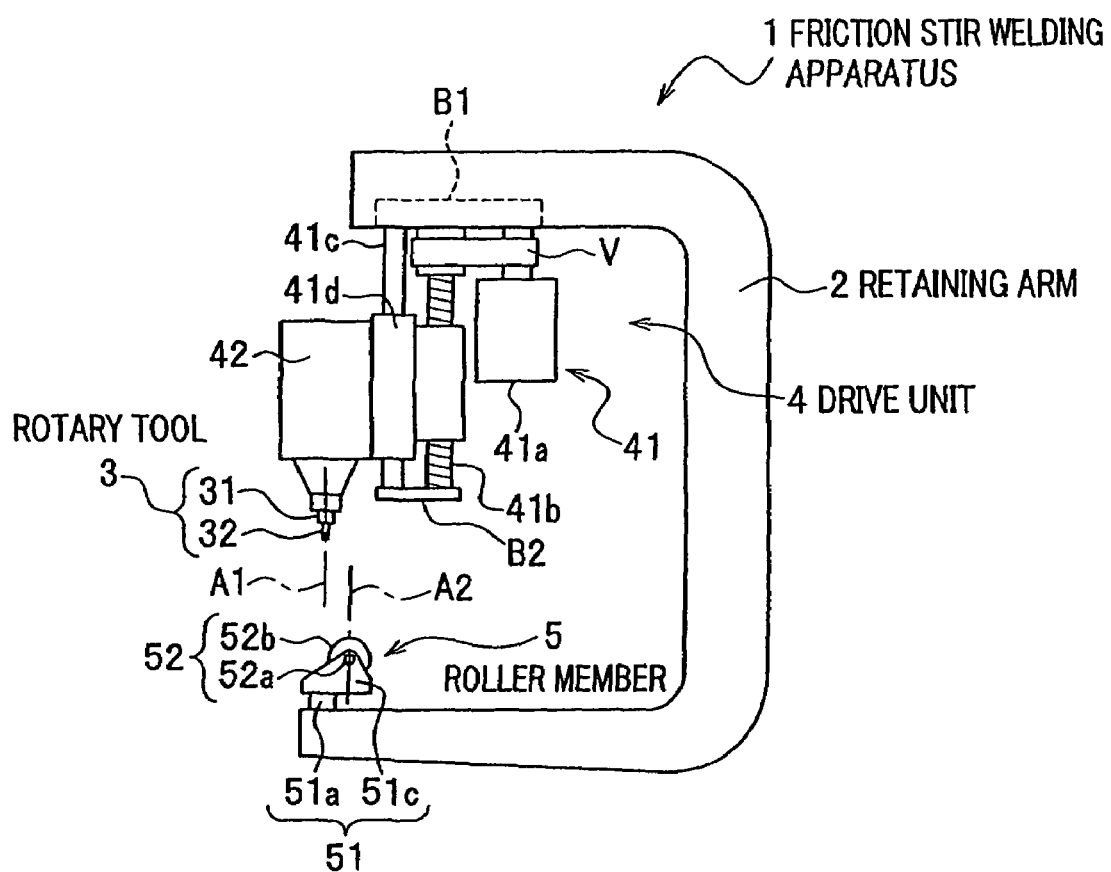
FIG. 5 is a front view of a friction stir welding apparatus according to a modified embodiment.

In the above preferred embodiment, the rotary shaft member 51 of the roller member 5 is coaxial with (on the same axis with) the rotation axis of the rotary tool 3 (see FIG. 2A). However, the tool center line A1 of the rotary tool 3 (i.e., axis of the rotary tool 3) and the roller center line A2 of the caster roller 52 may be slightly offset from each other such as shown in FIG. 5. To be more specific, the roller holder 51c of the rotary shaft member 51 may support the roller shaft 52a at a position slightly more inward of the retaining arm 2 when compared with the arrangement described in the above preferred embodiment. This enables the roller member 5 to always follow the joint line L2 in the traveling direction. Therefore, notwithstanding any complicated shape of the joint line L2, the workpieces W1, W2 can be joined together to provide a high-quality welding.

In the above preferred embodiment, the workpieces W1, W2 are both made of the same kind of material such as aluminum alloy. However, the friction stir welding apparatus 1 can be applicable to other workpieces made of the same material other than aluminum alloy or different kinds of materials.

In the above preferred embodiment, the workpieces W1, W2 are joined together while they are superposed one on top of another. However, the friction stir welding apparatus 1 can be applicable to other workpieces whose end surfaces are butted together.

In the above preferred embodiment, the workpieces W1, W2 are set on the work table T and the work table T is supported from the lower surface side. However, the workpieces W1, W2 may be directly supported from the lower surface side thereof.

In the above preferred embodiment, the roller member 5 is a so-called caster roller. However, the roller body 52b may be directly fixed to the retaining arm 2. In this configuration, the direction of the retaining arm 2 is adjusted when necessary in accordance with the direction of the joint line during the welding process.

In the above preferred embodiment, the friction stir welding apparatus 1 is attached to the distal end of the robot arm so as to be movable in three-dimensional directions. However, the friction stir welding apparatus 1 may be attached to equipment which allows two-dimensional movement on a plane.

Further, in the above preferred embodiment, the retaining arm 2 is provided with one roller member 5. However, two or more roller members 5 may be provided.

What is claimed is:

1. A friction stir welding apparatus comprising:
a rotary tool whose extremity constitutes a probe;
a retaining arm which supports the rotary tool; and
a roller provided at a position of the retaining arm opposite the rotary tool, said roller being disposed substantially directly opposite to said rotary tool;
wherein said roller is a caster roller which is operable relative to a couple of axes which are perpendicular to each other, one of said axes being parallel with a rotation axis of the rotary tool; and
wherein another of said axes of the caster roller is arranged at a position offset by a preset distance from the rotation axis of the rotary tool such that during three-dimensional friction stir welding operation of workpieces, a supporting point of the caster roller which comes in contact with the workpieces is maintained at a constant distance from the rotation axis and on a circular path having a predetermined radius about the rotation axis of the rotation tool.

2. A friction stir welding apparatus according to claim 1, wherein the caster roller is attached to a rotary shaft member which rotates about an axis parallel to the rotation axis of the rotary tool.

3. A friction stir welding apparatus according to claim 1, wherein the retaining arm is attached to a distal end of a robot arm, which is movable in three-dimensional directions.

4. A friction stir welding apparatus according to claim 2, wherein the retaining arm is attached to a distal end of a robot arm, which is movable in three-dimensional directions.

5. A friction stir welding apparatus according to claim 1, wherein the retaining arm is of a C-shaped form.

6. A friction stir welding apparatus according to claim 2, wherein the retaining arm is of a C-shaped form.

7. A friction stir welding apparatus according to claim 3, wherein the retaining arm is of a C-shaped form.

8. A friction stir welding apparatus according to claim 4, wherein the retaining arm is of a C-shaped form.

9. A friction stir welding apparatus according to claim 1, further comprising
a work table which supports workpieces which are to be welded together by the welding apparatus,
the work table and the workpieces being positioned in an opening of the retaining arm between the roller and the tool during a welding operation.

10. A friction stir welding apparatus according to claim 1, further comprising
a work table which supports workpieces which are to be welded together, and
a pressing drive unit which presses the rotary tool against the workpieces as supported on the work table,
a rotary drive which rotates the rotary tool to weld the workpieces together, and
the apparatus includes only the one roller disposed substantially opposite to the rotary tool such that the roller provides a reaction force from below the work table when the workpieces are being welded by the rotary tool.

11. A friction stir welding apparatus according to claim 1, wherein the caster roller is attached to a rotary shaft member which rotates about an axis which is parallel to the rotation axis of the rotary tool, and the caster roller freely rotates about an axis perpendicular to the rotation axis of the rotary tool.

12. A friction stir welding apparatus according to claim 10, wherein the rotary tool rotates about its axis when the welding apparatus welds workpieces together such that the roller moves in a direction where a joint line between the workpieces extends.

* * * * *